116,871

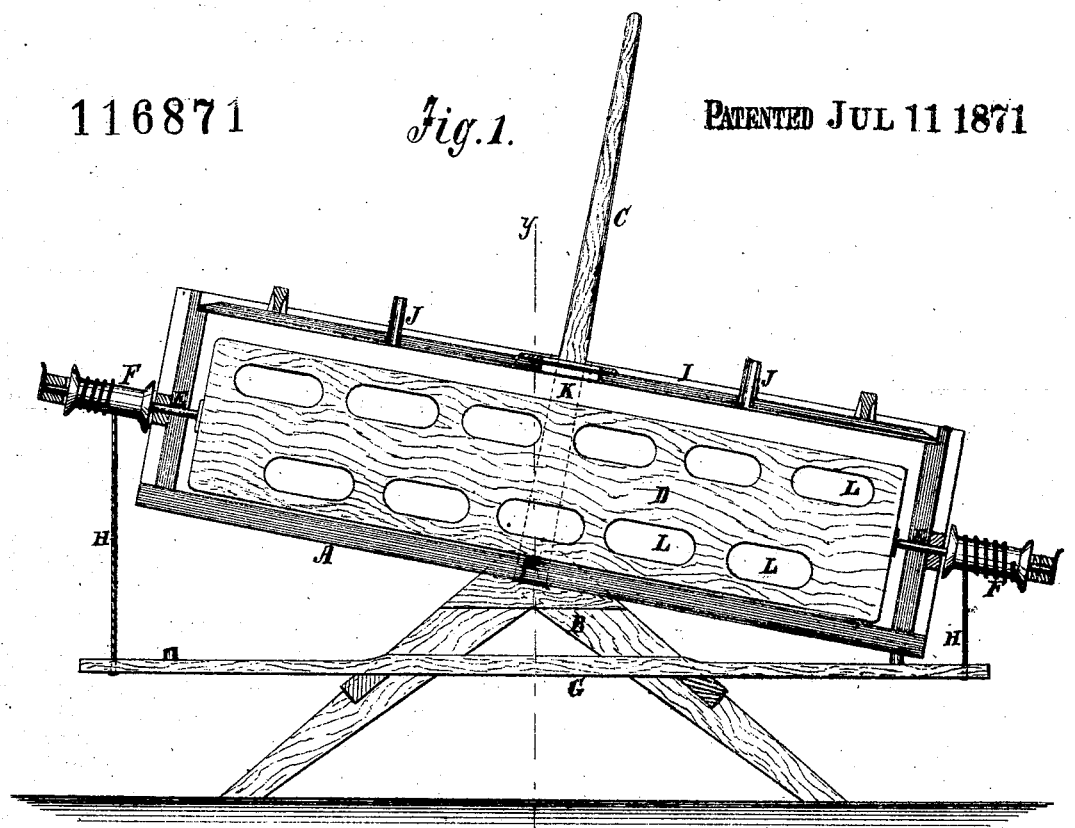
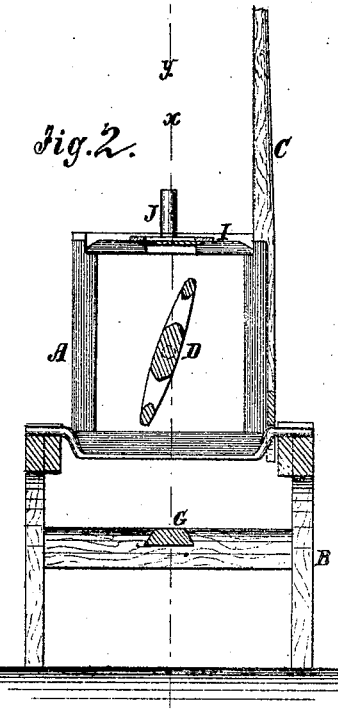

UNITED STATES PATENT OFFICE.

JACOB L. RUST, OF KEITHBURG, ILLINOIS.

IMPROVEMENT IN CHURNS.

Specification forming part of Letters Patent No. 116,871, dated July 11, 1871.

*To all whom it may concern:*

Be it known that I, JACOB L. RUST, of Keithburg, in the county of Mercer and State of Illinois, have invented a new and useful Improvement in Churns; and I do hereby declare that the following is a full, clear, and exact description thereof, which will enable others skilled in the art to make and use the same, reference being had to the accompanying drawing forming part of this specification.

The object of this invention is to facilitate the operation of making butter; and consists in an oscillating churn-vessel in which is a reciprocating rotating dasher, the construction and arrangement being as hereinafter more fully described.

In the accompanying drawing, Figure 1 represents a vertical longitudinal section of my improved churn taken on the line $x\,x$ of Fig. 1. Fig. 2 is a vertical cross-section taken on the line $y\,y$ of Fig. 1.

Similar letters of reference indicate corresponding parts.

A is the churn-vessel, which is rectangular in form, supported on pivot-bearings at the middle of its bottom on the stand B, as seen in Fig. 1. C is a lever attached to the side of the churn, by means of which the churn is operated. D is a dasher placed longitudinally in the churn, supported on journals E E, which pass through the ends of the churn, on the outer ends of which journals are pulleys F F. G is a horizontal bar supported on the cross-pieces of the stand B. H H are cords attached to the ends of the bar and to the pulleys F F, and wound around the latter in opposite directions, as seen in the drawing. As the churn is oscillated on its pivot-bearings, the dasher D will be revolved or made to turn about one revolution on its axis at each oscillation or movement of the lever, one of the cords being wound up around one of the pulleys and the other unwound from the other pulley, one cord serving to rotate the dasher in one direction and the other cord in the other direction, the power being applied in each case to the rising end of the churn. By this arrangement it will be seen that the cream or milk in the churn is constantly agitated by the rotating dasher, and at the same time made to flow by its own gravity toward the lower end of the churn as the latter is oscillated. The churn is tightly closed by a removable cover, I, through which are air-tubes J J. K is a glass window in the cover. The dasher may be made of a single flat plate or board with orifices L through it, as seen in the drawing, or with arms and slats or wings, as may be found most convenient or serviceable. The result of the compound motion imparted to the cream by this churn is, the globules are soon broken and the operation of churning is soon completed.

Having thus described my invention, I claim as new and desire to secure by Letters Patent—

1. The oscillating churn-vessel A and the rotating dasher D, when arranged to operate substantially as and for the purposes described.

2. The bar C, cords H H, and pulleys F F, arranged in combination with a churn-dasher, substantially as described.

JACOB L. RUST.

Witnesses:
WM. DEMSTER,
WILLIAM TWEED.